(12) United States Patent
Ananthaiyer et al.

(10) Patent No.: US 7,729,243 B2
(45) Date of Patent: Jun. 1, 2010

(54) REVERSE LINK RATE AND STABILITY CONTROL

(75) Inventors: Satish Ananthaiyer, Tewksbury, MA (US); Sae-Young Chung, Daejeon (KR); Sepehr Mehrabanzad, Southborough, MA (US)

(73) Assignee: Airvana, Inc., Chelmsford, MA (US)

( * ) Notice: Subject to any disclaimer, the term of this patent is extended or adjusted under 35 U.S.C. 154(b) by 994 days.

(21) Appl. No.: 11/037,515

(22) Filed: Jan. 18, 2005

(65) Prior Publication Data

US 2006/0159045 A1 Jul. 20, 2006

(51) Int. Cl.
*H04J 3/14* (2006.01)

(52) U.S. Cl. .................. 370/230; 370/329; 370/334; 370/468

(58) Field of Classification Search .............. 370/252, 370/278, 329, 334, 342, 230
See application file for complete search history.

(56) References Cited

U.S. PATENT DOCUMENTS

| | | | |
|---|---|---|---|
| 4,031,469 A | 6/1977 | Johnson | |
| 4,072,900 A | 2/1978 | Ray | |
| 5,631,604 A | 5/1997 | Dent et al. | |
| 5,828,677 A | 10/1998 | Sayeed et al. | |
| 5,842,140 A | 11/1998 | Dent et al. | |
| 5,857,147 A | 1/1999 | Gardner et al. | |
| 5,884,187 A | 3/1999 | Ziv et al. | |
| 5,923,650 A | 7/1999 | Chen et al. | |
| 5,982,760 A | 11/1999 | Chen | |
| 6,226,525 B1 | 5/2001 | Boch et al. | |
| 6,507,744 B1 | 1/2003 | Han et al. | |
| 6,567,420 B1 | 5/2003 | Tiedemann, Jr. et al. | |
| 6,633,552 B1 | 10/2003 | Ling et al. | |
| 6,697,378 B1 | 2/2004 | Patel | |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,904,286 B1 | 6/2005 | Dantu | |
| 6,965,564 B2 | 11/2005 | Coffman | |
| 6,983,153 B2 | 1/2006 | Jain et al. | |
| 6,999,425 B2 * | 2/2006 | Cheng et al. | 370/252 |
| 7,016,686 B2 | 3/2006 | Spaling et al. | |
| 7,031,141 B2 | 4/2006 | Kuriyama | |
| 7,082,317 B2 | 7/2006 | Yano et al. | |
| 7,085,570 B2 | 8/2006 | Tigerstedt et al. | |
| 7,120,134 B2 | 10/2006 | Tiedemann et al. | |

(Continued)

OTHER PUBLICATIONS

Office Action and response history as of Apr. 29, 2009 in U.S. Appl. No. 11/114,422.

(Continued)

*Primary Examiner*—Kevin C Harper
*Assistant Examiner*—Henry Baron
(74) *Attorney, Agent, or Firm*—Fish & Richardson P.C.

(57) ABSTRACT

In a radio access network, the reverse link rate of an access terminal is controlled and stabilized by determining a number of connections in one or more sectors in which the access terminal has a connection and setting a rate limit based on at least one of the determined number of connections. The number of connections can be determined for each sector in which the access terminal has a connection or for some subset of these sectors. If the number of connections is determined for more than one sector, the radio access network may limit the reverse link rate based on the sector having the greatest number of connections.

35 Claims, 8 Drawing Sheets

U.S. PATENT DOCUMENTS

| | | |
|---|---|---|
| 7,120,447 B1 | 10/2006 | Chheda et al. |
| 7,136,353 B2 * | 11/2006 | Ha et al. .................... 370/230 |
| 7,136,666 B2 | 11/2006 | Charriere et al. |
| 7,142,548 B2 | 11/2006 | Fong et al. |
| 7,170,871 B2 | 1/2007 | Eyuboglu et al. |
| 7,200,391 B2 | 4/2007 | Chung et al. |
| 7,206,291 B2 | 4/2007 | Soldani et al. |
| 7,242,958 B2 | 7/2007 | Chung et al. |
| 7,248,875 B2 | 7/2007 | Schreuder et al. |
| 7,248,889 B2 | 7/2007 | Schwarz et al. |
| 7,268,674 B2 | 9/2007 | Bohler et al. |
| 7,277,446 B1 | 10/2007 | Abi-Nassif et al. |
| 7,299,278 B2 | 11/2007 | Ch'ng |
| 7,305,241 B2 | 12/2007 | Hirvonen et al. |
| 7,366,230 B2 | 4/2008 | Jonsson |
| 7,466,669 B2 * | 12/2008 | Hosein ....................... 370/310 |
| 2002/0021687 A1 | 2/2002 | Toki et al. |
| 2002/0072385 A1 | 6/2002 | Salvarani et al. |
| 2002/0111183 A1 | 8/2002 | Lundby |
| 2002/0193118 A1 | 12/2002 | Jain et al. |
| 2002/0196749 A1 | 12/2002 | Eyuboglu et al. |
| 2003/0072294 A1 | 4/2003 | Wei et al. |
| 2003/0083092 A1 | 5/2003 | Kim et al. |
| 2003/0092463 A1 | 5/2003 | Charriere et al. |
| 2003/0100311 A1 | 5/2003 | Chung et al. |
| 2004/0038697 A1 | 2/2004 | Attar et al. |
| 2004/0047305 A1 | 3/2004 | Ulupinar |
| 2004/0109424 A1 | 6/2004 | Chheda |
| 2004/0110534 A1 | 6/2004 | Chung et al. |
| 2004/0179494 A1 | 9/2004 | Attar et al. |
| 2004/0179525 A1 | 9/2004 | Balasubramanian et al. |
| 2004/0185868 A1 | 9/2004 | Jain et al. |
| 2004/0202136 A1 | 10/2004 | Attar et al. |
| 2004/0213182 A1 | 10/2004 | Huh et al. |
| 2004/0229604 A1 | 11/2004 | Fong et al. |
| 2005/0047375 A1 | 3/2005 | Kwon et al. |
| 2005/0107090 A1 | 5/2005 | Hosein |
| 2005/0107091 A1 | 5/2005 | Vannithamby et al. |
| 2005/0124369 A1 | 6/2005 | Attar et al. |
| 2005/0169301 A1 | 8/2005 | Jain et al. |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2005/0250511 A1 | 11/2005 | Xiao et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0135173 A1 | 6/2006 | Vannithamby |
| 2006/0135189 A1 | 6/2006 | Nagaraj et al. |
| 2006/0159045 A1 | 7/2006 | Ananthaiyer et al. |
| 2006/0176187 A1 | 8/2006 | Bohler et al. |
| 2006/0215608 A1 | 9/2006 | Lee et al. |
| 2006/0240782 A1 | 10/2006 | Pollman et al. |
| 2006/0252429 A1 | 11/2006 | Chen et al. |
| 2006/0268798 A1 | 11/2006 | Kim et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0101015 A1 * | 5/2007 | Larsson et al. .............. 709/238 |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0202826 A1 | 8/2007 | Dean |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248035 A1 | 10/2007 | Sang et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0170547 A1 | 7/2009 | Raghothaman et al. |

OTHER PUBLICATIONS

Office Action and response history as of Apr. 8, 2009 in U.S. Appl. No. 10/835,537.

Office Action and response history as of Apr. 8, 2009 in U.S. Appl. No. 11/191,528.

U.S. Appl. No. 10/835,546, filed Apr. 28, 2004, including application as filed, transaction history from PAIR (PTO Website), and pending claims.

U.S. Appl. No. 10/835,537, filed Apr. 28, 2004, including application as filed, transaction history from PAIR (PTO Website), and pending claims.

U.S. Appl. No. 11/114,422, filed Apr. 26, 2005, including application as filed, transaction history from PAIR (PTO website), and pending claims.

U.S. Appl. No. 11/191,528, filed Jul. 28, 2005, including application as filed, transaction history from PAIR (PTO website), and pending claims.

U.S. Appl. No. 11/965,070, filed Dec. 27, 2007, including application as filed, transaction history from PAIR (PTO website), and pending claims.

3rd Generation Partnership Project "3GPP2", CDMA 2000 High Rate Packet Data Air Interface Specification, C.S0024-A, version 4.0, Oct. 25, 2002.

3rd Generation Partnership Project "3GPP2", CDMA 2000 High Rate Packet Data Air Interface Specification, C.S0024-A, version 1.0, Mar. 2004.

3rd Generation Partnership Project "3GPP2", CDMA2000 High Rate Packet Data Interface Specification, TIA/EIA/IS-856A, C.S0024-A, Version 2, Jul. 2005 (1227 pages).

3rd Generation Partnership Project "3GPP2", CDMA2000 High Rate Packet Data Interface Specification, TIA/EIA/IS-856B, C.S0024-B, Version 1, Apr. 2006 (1623 pages).

3rd Generation Partnership Project "3GPP2", CDMA2000 High Rate Packet Data Interface Specification, TIA/EIA/IS-856B, C.S0024-B, Version 2, Mar. 2007 (1627 pages).

Base Transceiver Station that Connects Mobile Phones to the Public Network, System Applications; Backbone Communications; Base Transceiver Stations (Mobile Telephony), NEC Electronics, Jun. 3, 2005, pp. 1-4, http://necel.com/en/solutions/applications/bs/bs.html.

Charkravarth, S., "Algorithm for Reverse Traffic Rate Control for cdma2000 High Rate Packet Data Systems", GLOBECOM2001, San Antonion, Texas, Nov. 2001 (pp. 3733-3737).

3rd Generation Partnership Project "3GPP2", "TSG-C WG3, 1xEV-DO, Evaluation Methodology", 3GPP2 TSG-C Contribution C30-20031002-004, Oct. 2004 (194 pages).

Attar, Rashid A. and Eduardo Esteves, "A Reverse Link Outer-Loop Power Control Algorithm for CDMA2000 1xEV Systems", Proceedings of ICC, Apr. 2002.

Garg, Vijay K., "IS-95 CDMA and cdma 2000 Cellular/PCS Systems Implementation", Communication Engineering and emerging Technologies, Series Editor, Theodore S. Rappaport, Chapter 10, Prentice Hall, 1999.

Steele, Raymond and Lajos Hanzo, "Mobile Radio Communications", Second Edition, Second Edition, Second and Third Generation Cellular and WATM Systems, Pentech Press Limited, London, England, 1992.

Office Action and response history as of Feb. 23, 2009 in U.S. Appl. No. 10/835,546.

Office Action and response history as of Feb. 12, 2009 in U.S. Appl. No. 10/835,537.

Office Action and response history as of Feb. 12, 2009 in U.S. Appl. No. 11/114,422.

Office Action and response history as of Feb. 23, 2009 in U.S. Appl. No. 11/191,528.

Office Action and response history as of Sep. 24, 2009 in U.S. Appl. No. 10/835,546.

Office Action and response history as of Aug. 9, 2009 in U.S. Appl. No. 11/114,422.

Office Action and response history as of Aug. 9, 2009 in U.S. Appl. No. 11/191,528.

Advisory action mailed Jul. 16, 2009 and request for continued examination filed Jul. 21, 2009 from U.S. Appl. No. 11/114,422.

Advisory action mailed Jun. 2, 2009 and request for continued examination filed Jul. 21, 2009 from U.S. Appl. No. 10/835,546.

Office Action and response history as of Dec. 9, 2009 in U.S. Appl. No. 11/114,422.

Office Action and response history as of Oct. 14, 2009 in U.S. Appl. No. 10/835,537.

Office Action and response history as of Oct. 14, 2009 in U.S. Appl. No. 11/191,528.

* cited by examiner

REVERSE LINK RATE AND STABILITY CONTROL

FIELD

This disclosure relates to control of reverse link rate and stability in a multi-user wireless communication system.

BACKGROUND

In a radio access network, such as a cellular network, it is often important to ensure that sectors in the network do not become overloaded. One way in which a sector can become overloaded is if many access terminals (e.g., cellular devices) in a sector transmit at high data rates, which increases the transmission power. In a first Evolution Data-Only (1xEV-DO) network, the 1xEV-DO protocol provides mechanisms for measuring sector load (referred to as a "rise-over thermal (ROT)" measurement) and reducing the transmission rates of ATs in the sector by transmitting a bit (referred to as the "reverse activity bit") to ATs in a sector that is becoming overloaded. However, ROT measurement may not always be not available, and, in these cases, a radio access network may fail to detect and mitigate overloading of a sector.

SUMMARY

In one aspect, the invention features a method for controlling the rate of transmission of an access terminal in a radio access network (e.g., a 1xEV-DO network) that includes, for one or more sectors in which the access terminal has a connection, determining a number of connections for the sector, and setting a rate limit for the access terminal based on one or more of the determined number of connections.

Implementations may include one or more of the following features. The method may include determining a number of connections for each sector in which the access terminal has a connection (e.g., sectors in which an AT is in soft or softer handoff). The method may also include determining a number of connections for a subset of sectors in which the access terminal has a connection (e.g., only those sectors in which the access terminal has a connection serviced by a common radio node).

Determination of a number of connections may include determining an effective number of connections for a sector. Determining an effective number of connections for a sector may include, for each connection in a sector, applying a weight to one or more characteristics of the connection to determine a weighted connection, and summing the weighed connections.

Setting a rate limit for the access terminal based on one or more of the determined number of connections may include using a rate-limit table to set a rate limit. A rate limit table may, for example, assign a first rate limit if a number of connections determined for the access terminal is within a first range of values, and a second rate limit if a number of connections determined for the access terminal is within a second range of values. If a number of connections is determined for multiple sectors in which an AT has a connection, the method may set a rate based on an determined number of connections for a sector having a value equal to or greater than any other effective number of connections determined for other sectors.

The method may including changing the way in which a number of connections is determined for a sector (e.g., applying different weights to connections in a sector) and/or a rate limit table used to set rate limitations based on the way in which the radio access network performs its RA bit estimation. If it uses ROT measurement to set or clear RA bits for ATs, the method may use one rate limit scheme, whereas if ROT measurement is not available (and the system uses, for example, post-automatic gain control-ROT estimation), then the method may use a different rate limit scheme. The method may include transmitting a rate limit message via a broadcast message or a unicast message to the access terminal. The method may also include transmitting to the access terminal a rate limit message immediately upon the access terminal establishing a connection in a sector.

In another aspect, the invention features a radio node configured to transmit radio signals to and receive radio signals from an access terminal having one or more connections in a group of one or more sectors of a radio access network. The radio node includes a processor and a medium bearing instructions to cause the processor to determine a number of connections for one or more sectors in which the access terminal has a connection and set a rate limit for the access terminal based on at least one of the determined number of connections.

Implementations may include one or more of the following features. The radio node may be configured to determine a number of connections for each of sector in the group of sectors in which the access terminal has a connection. If the radio node determines multiple numbers of connections for sectors in which the access terminal has a connection, the radio node may be configured to base a rate limit on the greatest determined number of connections.

The radio node may be configured to receive (e.g., from another radio node or from an radio network controller) an effective number of connections for other sectors in the radio access network in which the access terminal has a connection but is not in the group of sectors serviced by the radio node.

The radio node may be configured to determine an effective number of connections by, for example, weighting characteristics of each connection in a sector and summing the weighed connections. The radio node may be configured to set a rate limit based on a rate limit table that, for example, specifies a first rate limit if a number of effective connections determined for the access terminal is within a first range of values and specifies a second rate limit if a number of effective connections determined for the access terminal is within a second range of values. The radio node may also be configured to transmit a rate limit to the access terminal (e.g., via a broadcast or unicast message).

In another aspect, the invention features a system for controlling the rate of transmission of an access terminal in a radio access network that includes a processor and a medium bearing instructions to cause the processor to determine an effective number of connections for one or more sectors in which the access terminal has a connection and set a rate limit for the access terminal based on at least one determined effective number of connections.

In one specific implementation, the processor of the system may be part of a radio network controller. In cases where the processor is part of a radio network controller, the instructions may be written to cause the processor to determine a number of connections for each of sector in which the access terminal has a connection. If the access terminal has connections in multiple sectors, the radio network controller may set a rate limit based on the sector with the greatest number of connections.

In another particular implementation, the processor of the system may be part of a radio node that services a group of sectors. The instructions may be written to determine a number of connections for each of the sectors in the group of sectors in which the AT has a connection. The radio node may be configured to set a rate limit based only on this determination. The radio node may also be configured to receive information (e.g., from an RNC or from other RNs) on numbers of connections in sectors other than the group of sectors with which the AT has a connection and may be configured to set a rate limit based also on these numbers of connections. The system may also include a radio network controller that is configured to determine a number of connections for sectors outside the RN's group of sectors with which the AT has a connection. The radio network controller may be configured to also send the AT a rate limit message based on these numbers.

DETAILED DESCRIPTION

Figure 1:
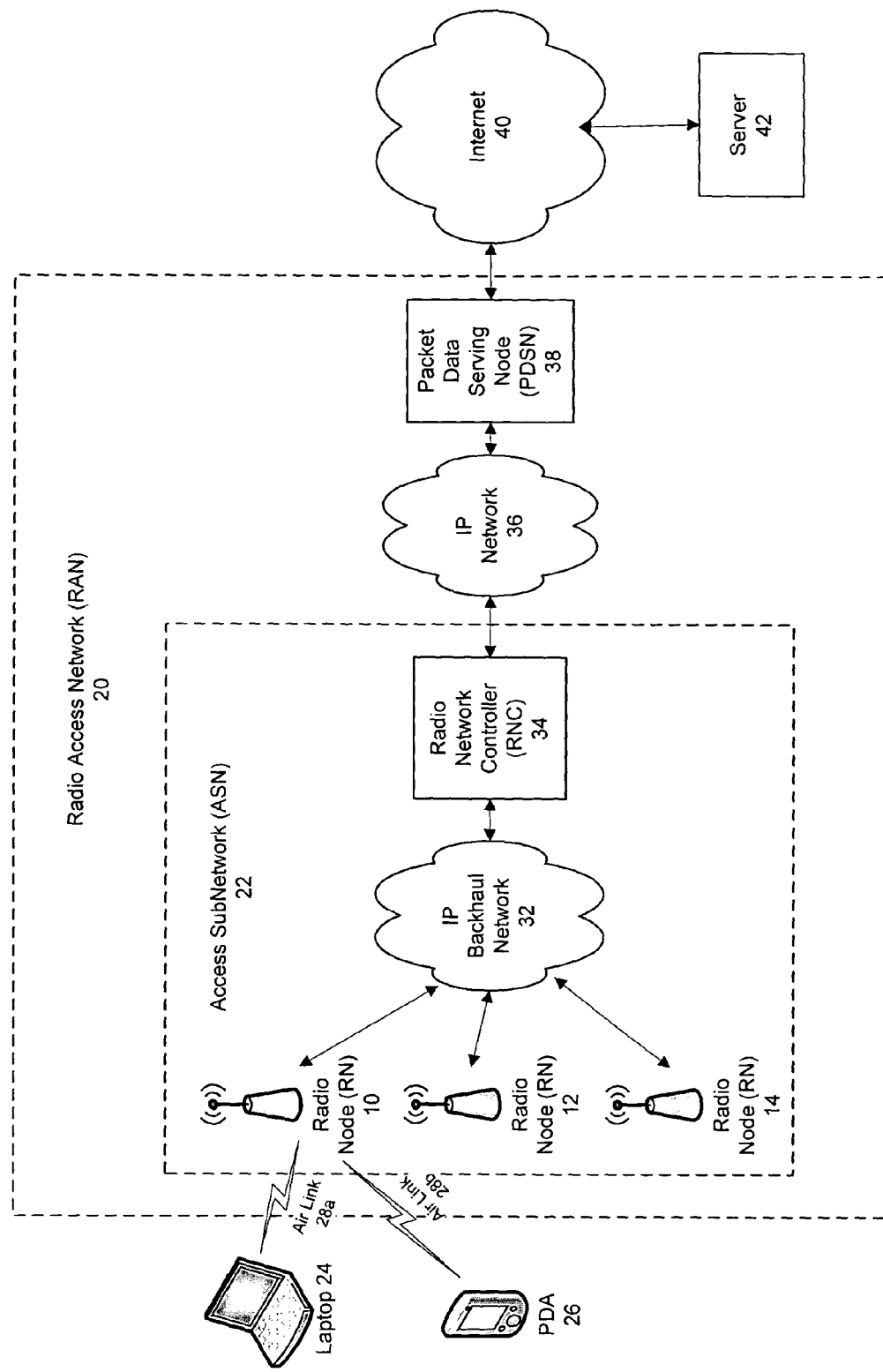
FIG. 1 is a diagram of a radio access network.

Referring to FIG. 1, a radio access network (RAN) 20 uses the first evolution data-only (1xEV-DO) protocol to transmit data packets between an AT, such as laptop 24 and personal data assistant (PDA) 26, and an external network such as the Internet 40. The 1xEV-DO protocol has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference.

The radio access network 20, which may cover a large service area, includes one or more Access Sub-Networks (ASN's), e.g., ASN 22, each anchored by a Radio Network Controller (RNC) 34 communicating with several Radio Nodes (RN's) 10, 12, 14 using a private or public IP backhaul network 32. Each RN may support multiple sectors, such as the three sectors shown in FIG. 1, with each sector covering a certain cell area around the RN.

ASN 22 is connected over a public or private IP network 36 to one or more Packet Data Serving Node's (PDSN's), e.g., PDSN 38. The PDSN, in turn, receives and transmits data packets (e.g., voice over IP packets) to a server 42 via the Internet 40. In some implementations, the functions of a PDSN and an RNC are combined into a single device.

Each AT is in communication with a radio node, e.g., RN 10, via an air link 28a, 28b. An air link comprises a forward link, which carries data transmitted from an RN to an AT, and a reverse link, which carries data transmitted from the AT to the RN. As an AT moves from one sector to another sector serviced by the same RN, it undergoes a "softer handoff" between the sectors. Similarly, when an AT moves from one sector to another sector serviced by different RNs, it undergoes a "soft handoff" between the RNs. When an AT is in soft or softer handoff, it will have connections in multiple sectors.

Figure 2:
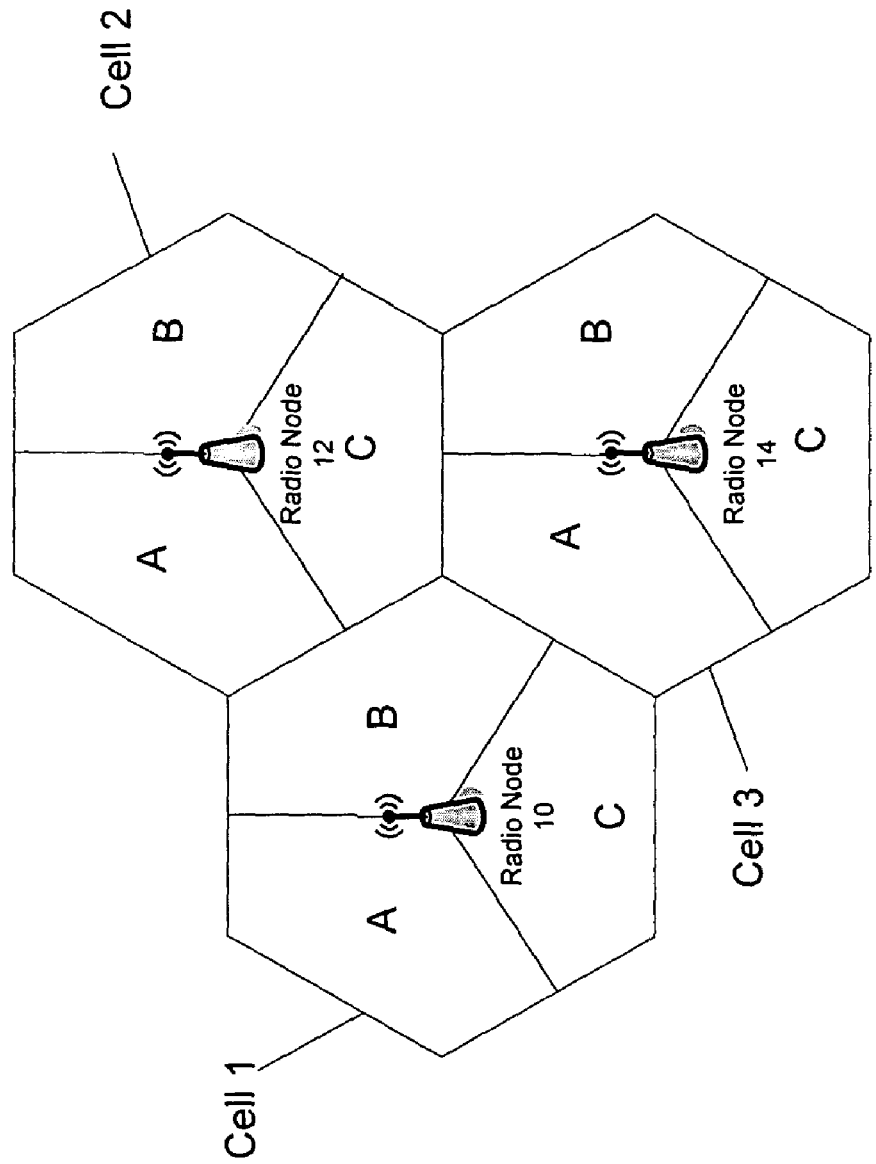
FIG. 2 is a diagram of several cells and sectors in a radio access network.

As shown in FIG. 2, a geographic area covered by radio access network 20 (shown in FIG. 1) is divided into multiple cells 1, 2, and 3, which are each further divided into three sectors A, B, and C. Each cell includes a radio node (RN) 10, 12, 14 that communicates with access terminals (e.g., cellular telephones) (not shown) located within each RN's cell. Each radio node uses a directional antenna (not shown) appropriately positioned in each sector to send data to and receive data from ATs located in the sectors.

Figure 3:
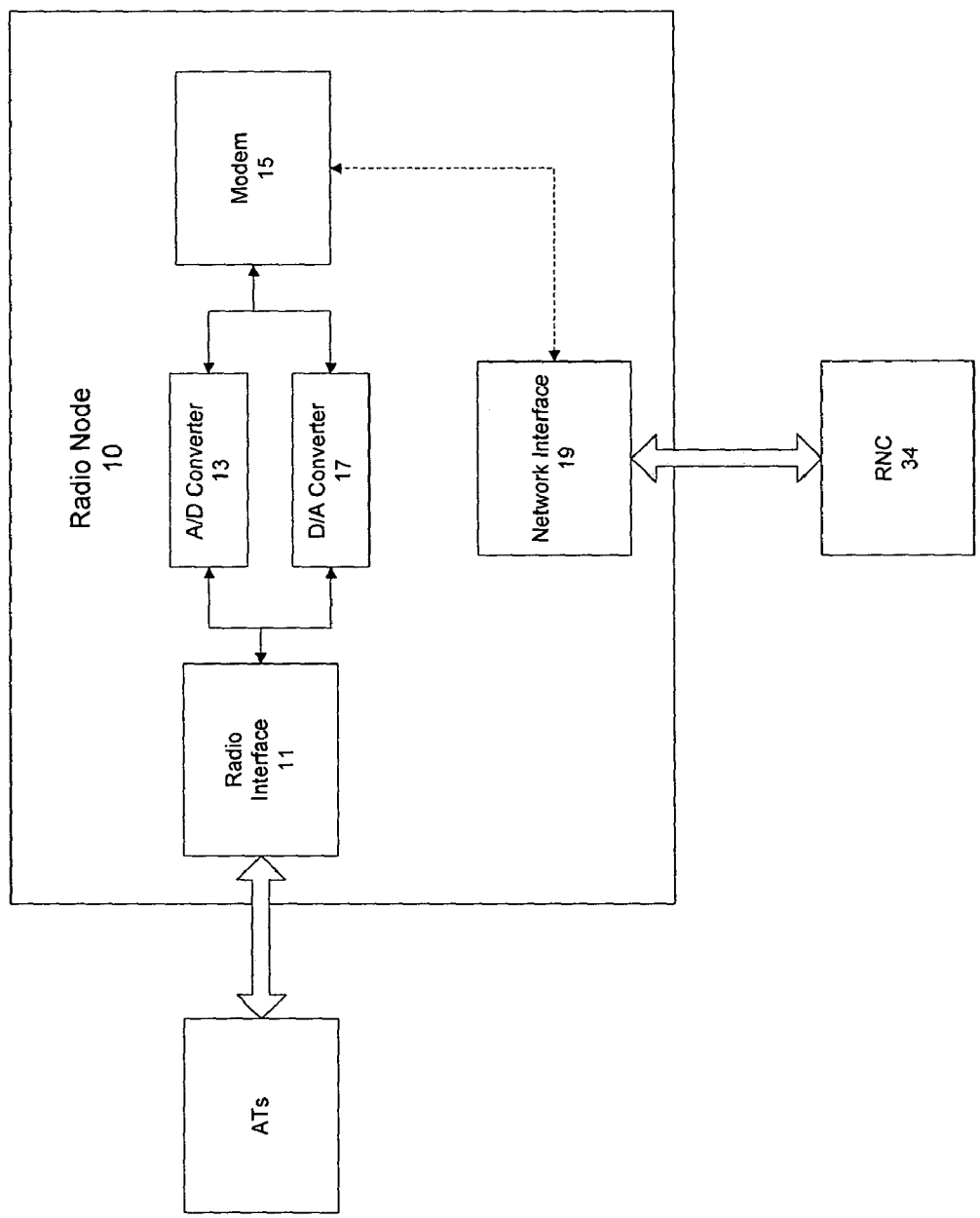
FIG. 3 is a diagram of a radio node.

As shown in FIG. 3, each radio node, e.g., RN 10, includes a radio interface 11 and modem 15 for transmitting radio signals to and receiving radio signals from ATs in a sector. A set of digital-to-analog and analog-to-digital converters 13, 17 converts the data exchanged between the radio interface 11 and the modem 15. The radio node also includes network interface 19 for exchanging digital data between the RN and an RNC, e.g., RNC 34, via a backhaul network (e.g., backhaul network 32 shown in FIG. 1).

The pole capacity is the theoretical capacity of access terminals supported by a radio node. The pole capacity of an RN is a function of the signal-to-noise ratio (SNR) necessary to achieve a certain aggregate data rate with a certain aggregate error rate within a cell. Pole capacity is a theoretical maximum capacity of a cell and it is often advisable to design radio access networks in which the number of active ATs within a cell is limited to some percentage of the pole capacity, e.g., 50% to 75% of the pole capacity, which corresponds to an Rise-Over-Thermal (ROT) of 3 or 6 dB respectively.

A radio node, such as RN 10 shown in FIGS. 1-3, can determine whether one of its sectors is becoming overloaded by measuring the rise over thermal (ROT) value of the sector. The radio node can determine the ROT of a sector by measuring the thermal noise at the radio receiver in the sector when all ATs in the sector are silent. (IS-856 provides a mechanism in which a radio node and ATs in a sector served by the radio node can set up a time and duration during which ATs in the sector will remain silent.)

When a radio node is able to measure sector load using ROT, it can control load on the sector by setting (or clearing) the reverse activity (RA) bit in the reverse activity channel on the forward link. More particularly, the radio node compares the ROT value with a predetermined threshold, which is referred to as the RA bit threshold. The RA bit threshold corresponds to some percentage of nominal sector loading (typical values are about 50 to 60% of nominal sector loading). If the ROT value is above the RA bit threshold, then the radio node sets the RA bit, otherwise the radio node clears the bit.

The RN transmits an RA bit every RAB length slots over the RA medium access control (MAC) channel (which is a component channel of the reverse activity channel). When an AT receives data on a MAC channel with the RA bit set, the AT executes a "coin-flip" algorithm to determine whether to freeze or reduce its transmit rate. If the coin-flip has a first outcome, the AT freezes its transmit rate, if the coin-flip has a second outcome, the AT decreases its rate from its current rate to the next lowest rate defined by IS-856. By reducing the rate at which ATs transmit on the reverse link, ATs transmit at less power and cause less interference in the sector, which decreases the ATs usage of the sector's capacity.

In some cases, the RN's radio interface is not available, and, as a result, sector load cannot be measured using ROT. In this situation, sector load is measured by the RN's modem using post-Automatic Gain Control (AGC)-ROT estimation. A post-AGC-ROT estimate is not as accurate as a ROT measure because it typically does not account for interference from ATs that do not have active connections on that sector (interference generated by other sectors). Because of post-AGC-ROT estimation may be inaccurate, the RA bit may not get set when a sector is becoming overloaded. If the RA bit is not properly set, ATs in the sector are free to transmit at higher rates (and thus also higher powers), which may eventually lead to an overpowering of the reverse link. As the number of active ATs in the sector grow, the problem is exacerbated because as the number of active connections grows, the effective SNR of all ATs denigrates until eventually the ATs in the sector lose the reverse link.

To prevent overloading when ROT measurement is not available, RAN 20 (shown in FIG. 1) also employs a reverse rate and stability control algorithm that allows it to variably control the data rate of the reverse link of ATs in a sector. The reverse rate and stability control algorithm includes two basic components: (i) a generalized rate-weighting algorithm by which a RAN determines the "effective number of connections" in one or more sectors with which an AT has a connection, and (ii) a maximum rate limit table (MRLT), which dictates a rate limit for an AT based on the determined effective number of connections. In some implementations, the RAN sets a rate limit for an AT having connections in multiple sectors based on the sector with the largest effective number of connections. For example, if an AT has a connection in sector "A" having an effective number of connections equaling 10 and sector "B" having an effective number of connections equaling 20, the RAN sets a rate limit for that AT based on an effective number of connections of 20.

The generalized rate-weighting algorithm assigns weights to connections in a sector to determine an effective number of connections in the sector. If an AT is in softer handoff and has connections in two or more sectors serviced by the same RN, the generalized rate-weighting algorithm is applied to each of the sectors with which the AT has a connection. In some implementations, if the AT is in soft handoff and has connection in two or more sectors serviced by different RNs, the generalized rate-weighting algorithm is applied to each of the sectors with which the AT has a connection. As mentioned above, if an AT has connections in multiple sectors, the RAN may base the ATs rate limit on the largest effective number of connections of the sectors with which the AT has a connection.

The generalized rate-weighting algorithm provides systems engineers the ability to weight the following characteristics of connections in a sector:

a. whether a connection has data to send;

b. the location of the AT associated with the connection in the sector using the earliest pseudo-random noise offset (EPNO) measurement during network access (for example, an AT that is close to a sector boundary may be weighted more than ATs close to a boundary since it is more likely to cause more interference to the neighboring sectors);

c. the connection's requested downlink rate (for example, an AT requesting a higher downlink rate may be weighted less since it is close to the radio node and less likely to cause interference to neighboring sectors);

d. a soft/softer handoff factor assigned to ATs that are in soft/softer handoff (for example, an AT in soft/softer handoff is weighted more than one not in handoff since an AT in soft/softer handoff is at the cell edge and could potentially cause interference to neighboring sectors); and e. the strength of the connection's signal(s) are reported in the route update message (for example, the weight of a connection may be lessened if the connection reports a weak pilot signal strength for the sector in question, which indicates that the AT is only just able to observe the specific sector pilot).

In addition to variably weighting characteristics of connections in a sector, the generalized rate-weighting algorithm can be programmed to weight connections differently based on their transmit rate. Thus, for example, the soft/softer handoff factor of a connection transmitting at one rate can be weighted differently than the soft/softer handoff factor of another connection transmitting at a different rate.

After weighting the connections in a sector, the weighted connections in the sector are summed to obtain the effective number of connections in the sector. For example, in some implementations the generalized weight-rating algorithm is programmed according to Table I.

TABLE I

| 1xEVDO RL Rate (Kbps) | Weights $W_i = \text{sum}[(1/6)(P_1, \ldots, P_6)]$ such that $0 <= \text{sum}[(1/6) (P_1, \ldots, P_6)] <= 1$ | EPNO (P1) | DRC (P2) | Soft/Softer Handoff Count (P3) | Effective RL Rate (P4) | Connection Has Data to send (P5) | Pilot Strength from Route Update (P6) |
|---|---|---|---|---|---|---|---|
| 153.6 | W5 | 0 | 0 | 0 | 0 | 6 | 0 |
| 76.8 | W4 | 0 | 0 | 0 | 0 | 6 | 0 |
| 38.4 | W3 | 0 | 0 | 0 | 0 | 6 | 0 |
| 19.2 | W2 | 0 | 0 | 0 | 0 | 6 | 0 |
| 9.6 | W1 | 0 | 0 | 0 | 0 | 0 | 0 |

As shown, the generalized rate-weighting algorithm has been programmed only to consider whether a connection has data to send and ignores other characteristics of a connection. In addition, the generalized rate-weighting algorithm ignores connections that are transmitting at the lowest 1xEV-DO rate of 9.6 Kbps. Thus, if a sector has 10 connections and 4 of the 10 connections have data to send and of these 4 connections, one is transmitting at 9.6 Kbps, the generalized rate-weighting algorithm (as programmed according to Table I) will determine that there are 3 effective number of connections in the sector.

The RAN then sets a maximum rate limit for ATs in the sector based on the effective number of connections. If an AT has multiple connections for which an effective number of connections has been determined, the RAN may set the rate limit based on the largest effective number of connections of the sector with which the AT has a connection. In some implementations, the RAN uses the maximum rate limit table shown in Table II to set a maximum rate limit for the sector.

TABLE II

| Effective Number of Connections (C) | Maximum Rate Limit (Kbps) |
|---|---|
| $1 <= C <= 7$ | 153.6 |
| $8 <= C <= 59$ | 76.8 |

Thus, if the effective number of connections determined by the generalized rate-weighting algorithm is between 1 and 7, the RAN permits the ATs to transmit at the maximum 1xEV-DO rate of 153.6 Kbps. If the effective number of connections is between 8 and 59, the RAN limits the ATs in the sector to transmit at the second-highest 1xEV-DO rate of 76.8 Kbps. The current iteration of 1xEV-DO limits the number of connection in a sector to 59, which is why the table does not account for situations where the effective number of connections is over 59. However, future iterations of 1xEV-DO may increase the maximum number of connections in a sector, in which case, the rate limit table would be extended. Additionally, some implementations may use other rate limit tables to limit transmit rates of ATs based on characteristics of a sector (e.g., the hardware capabilities of a sector, the presence of objects like buildings that cause interference in a sector, etc.).

Some implementations may use any one or a combination of the connection characteristics described above to determine an effective number of connections. In addition, weighting of connection characteristics can vary depending on the transmit rate of the connection.

The RAN can be configured to transmit rate limit messages by way of unicast or broadcast messaging. For broadcast messaging, the RAN transmits a rate limit message to all ATs in a sector over the control channel on the forward link. For unicast messaging, the RAN transmits a rate limit message sent to individual ATs over the forward traffic channel on the forward link.

When an AT establishes a connection with a sector, it does so at the lowest rate, i.e., 9.6 Kbps, and will remain at this rate until it receives a rate limit message. Because it may take some time before the RAN transmits a rate limit message (e.g., a RAN may be configured to periodically broadcast rate limit messages in a sector), in some implementations the RAN is configured to send a rate limit message at the maximum rate of 153.6 Kbps immediately after a new connection is established to prevent an AT from needlessly remaining at a low transmit rate while waiting for a first rate limit message.

Figure 4:
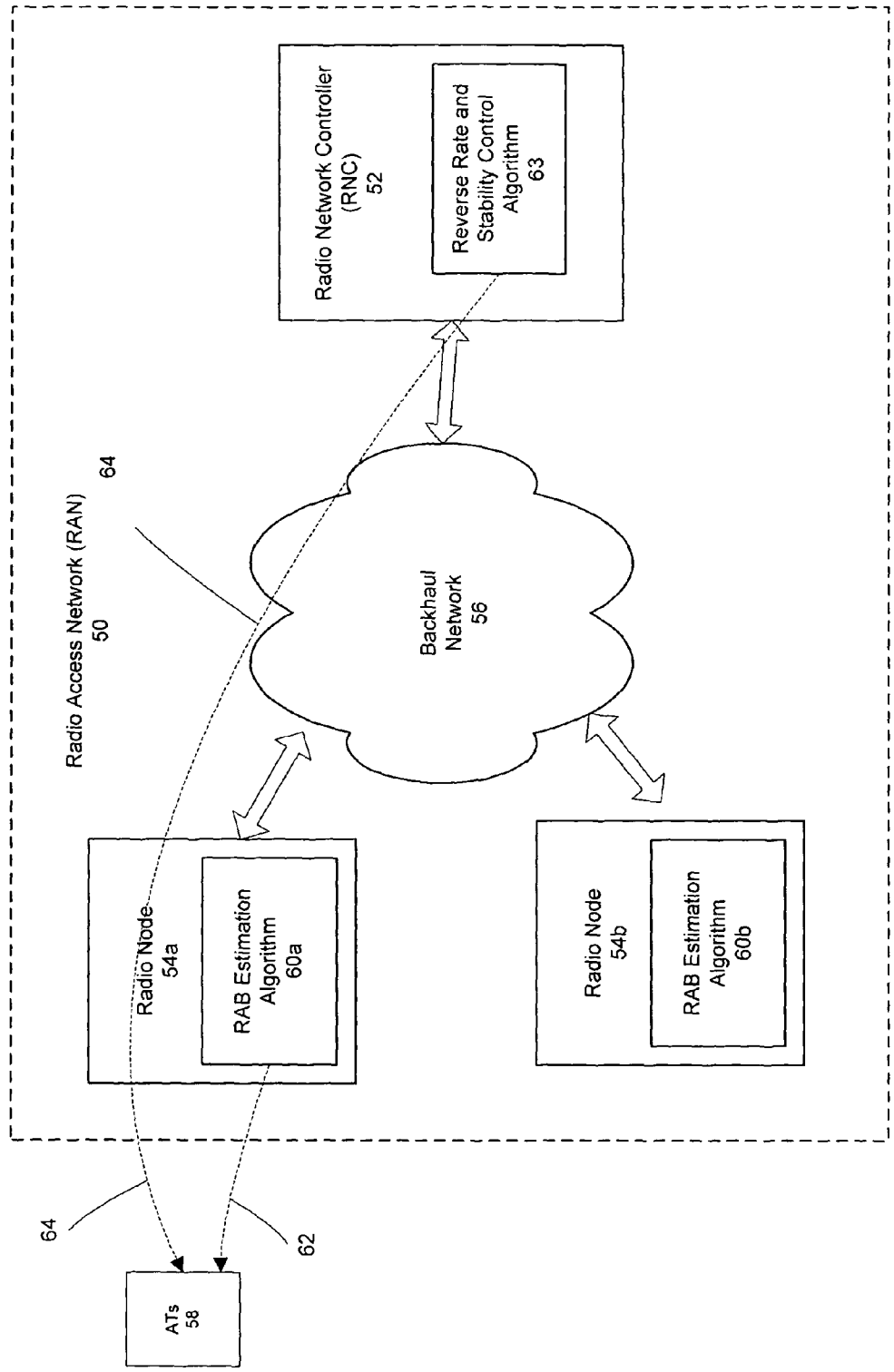
FIGS. 4-7 are diagrams of radio access networks.

In some implementations determination of the effective number of connections and rate control is determined by the RNC. For example, as shown in FIG. 4, a RAN 50 includes an RNC 52 in communication with two RNs 54a, 54b over a backhaul network 56. For simplicity, it is assumed that each RN serves a single sector. Each RN includes an RA bit estimation algorithm 60a, 60b, which performs ROT measurements or, if not available, provides a post-AGC-ROT estimation, to set or clear the RA bit. As described in more detail above, the RNs transmit the RA bit 62 on the MAC channel to ATs 58 in the sector.

RNC 52 includes a reverse rate and stability control algorithm 63, which, as described above, uses the generalized rate-weighting algorithm to determine an effective number of connections for an AT over ALL sectors that the AT is in handoff with and then uses a rate limit table (e.g., Table II above) to set rate limits for the AT.

Rate limit messages 64 can be transmitted to ATs in the sector either via unicast or broadcast messaging. Unicast messages are reliable, but an individual message needs to be sent to each AT. This may increase the processing load on the RNC and signaling traffic between the RAN and the AT. If unicast messaging is used, the rate limit message can be transmitted either periodically or whenever there is a change in the rate limit.

Broadcast messages are best effort (and thus not as reliable as unicast messages). However, a broadcast rate limit message can be a single message per sector transmitted over the control channel of the sector. Thus, broadcasting conserves RNC processing resources and signaling bandwidth between RN and AT. As with unicast messaging, a broadcast rate limit message can be transmitted either periodically or whenever there is a change in the rate limit. It should be noted that broadcast rate limit messages normally need to be transmitted to the AT through its serving sector, and there can be ambiguity in choosing the serving sector when the AT is switching sectors. However, periodic broadcasted rate limit messages tend to diminish this problem. Furthermore, due to the format of a broadcasted rate limit message, non-serving sectors sometimes have to transmit rate limit information for the AT, and, therefore, in some implementations, rate limit information for an AT is broadcasted from all sectors in handoff with an AT targeted for a rate limit.

Figure 5A:
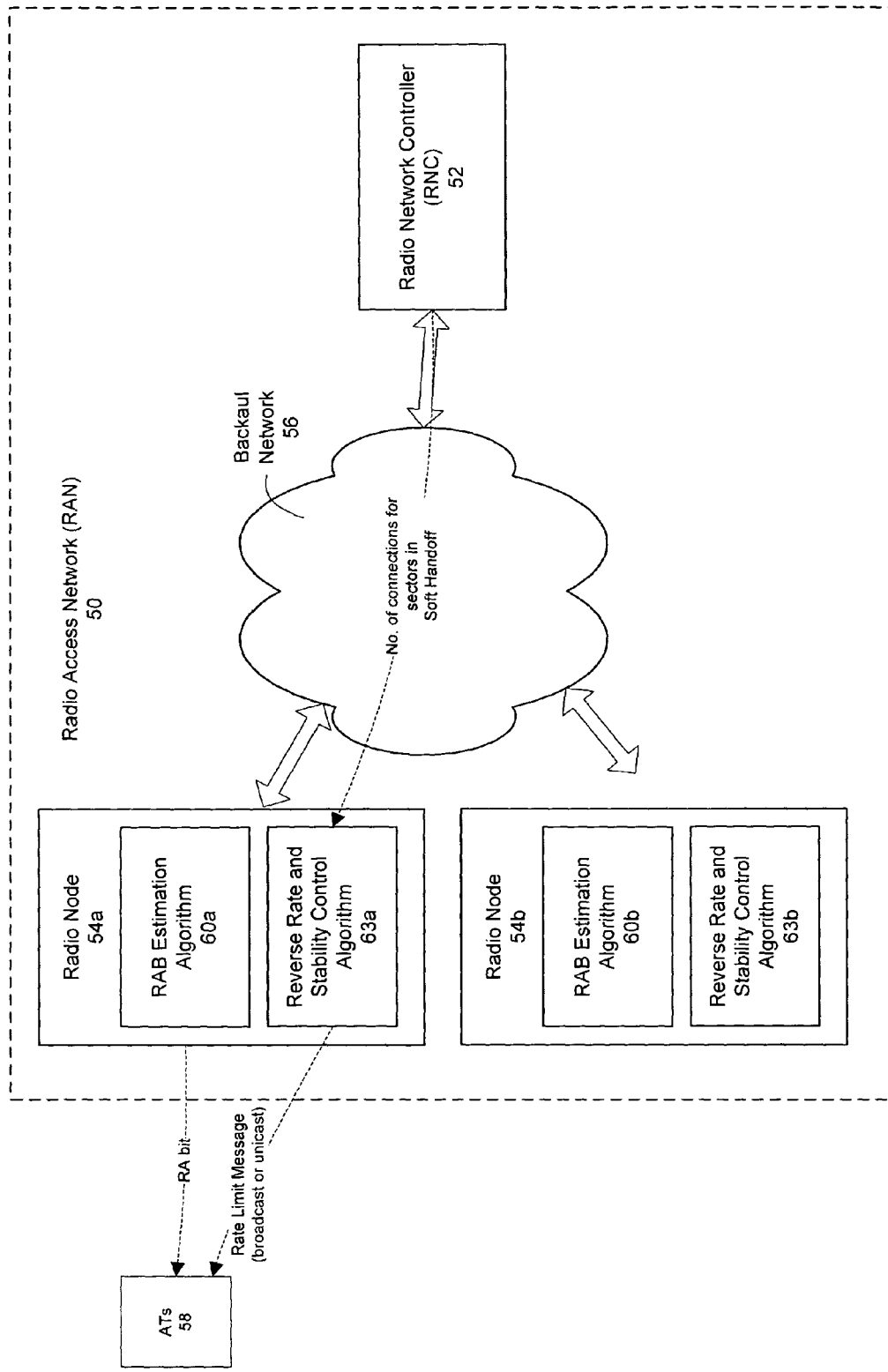
Figure 5B:
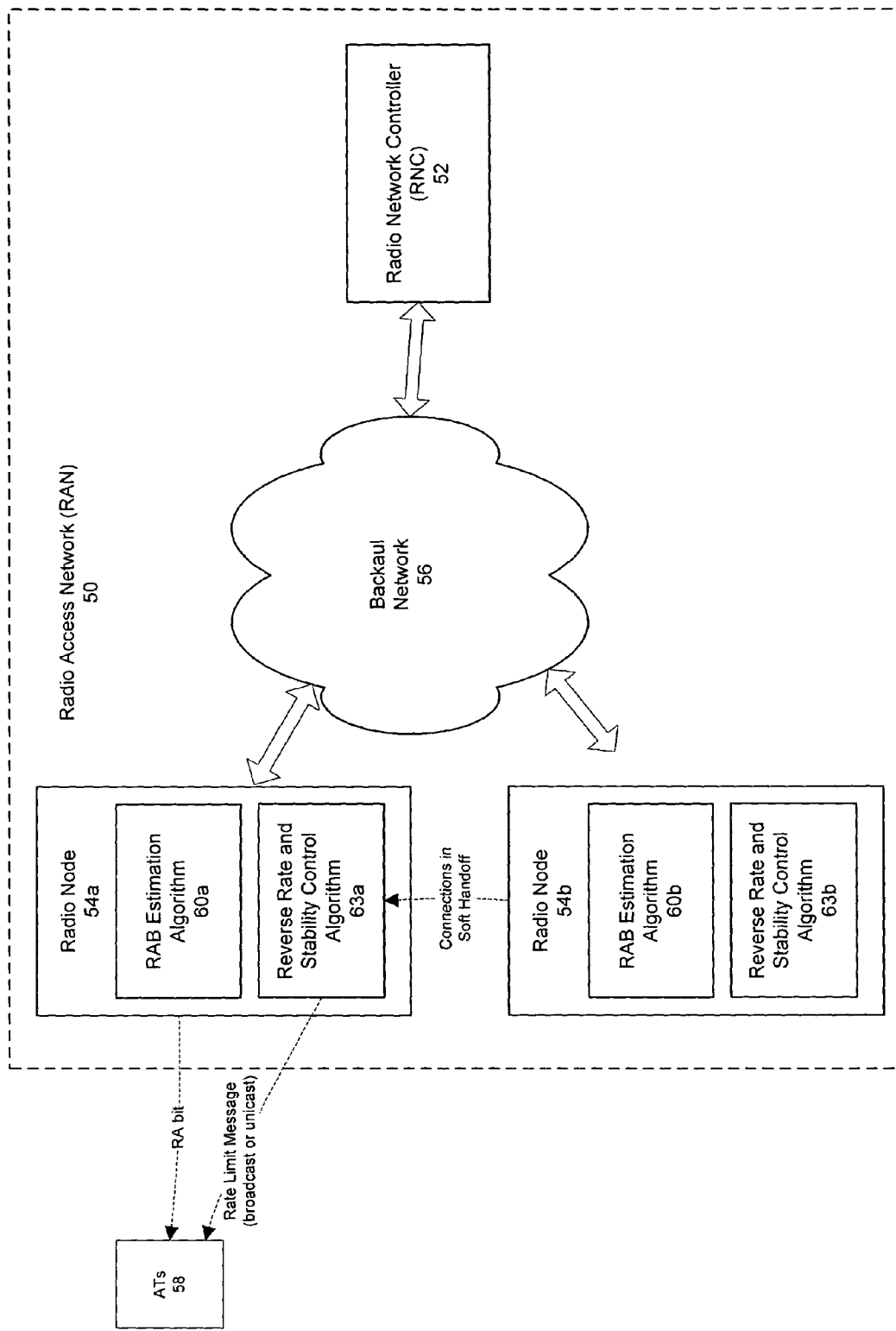

In some implementations, a reverse rate and stability control algorithm is implemented at the radio node. For example, as shown in FIGS. 5A-5B, each radio node 54a, 54b executes a reverse rate and stability control algorithm 63a, 63b in addition to the RA bit estimation algorithm 60a, 60b. In the implementation illustrated in FIG. 5A, if an AT is in soft handoff (and therefore has a connection with a sector outside RN 54a), the effective number of connections for the sector(s) with which the AT has a connection but are outside the service area of RN 54a are provided by the RNC that services the sector(s). In the implementation illustrated in FIG. 5B, the effective number of connections for sector(s) with which the AT has a connection but are outside the service area of the RN executing the reverse rate and stability control algorithm (e.g., RN 54a) are provided directly by the appropriate RN via inter-RN messaging. As before, an RN can transmit rate limit messages to ATs via either broadcast or unicast messaging.

Figure 6:
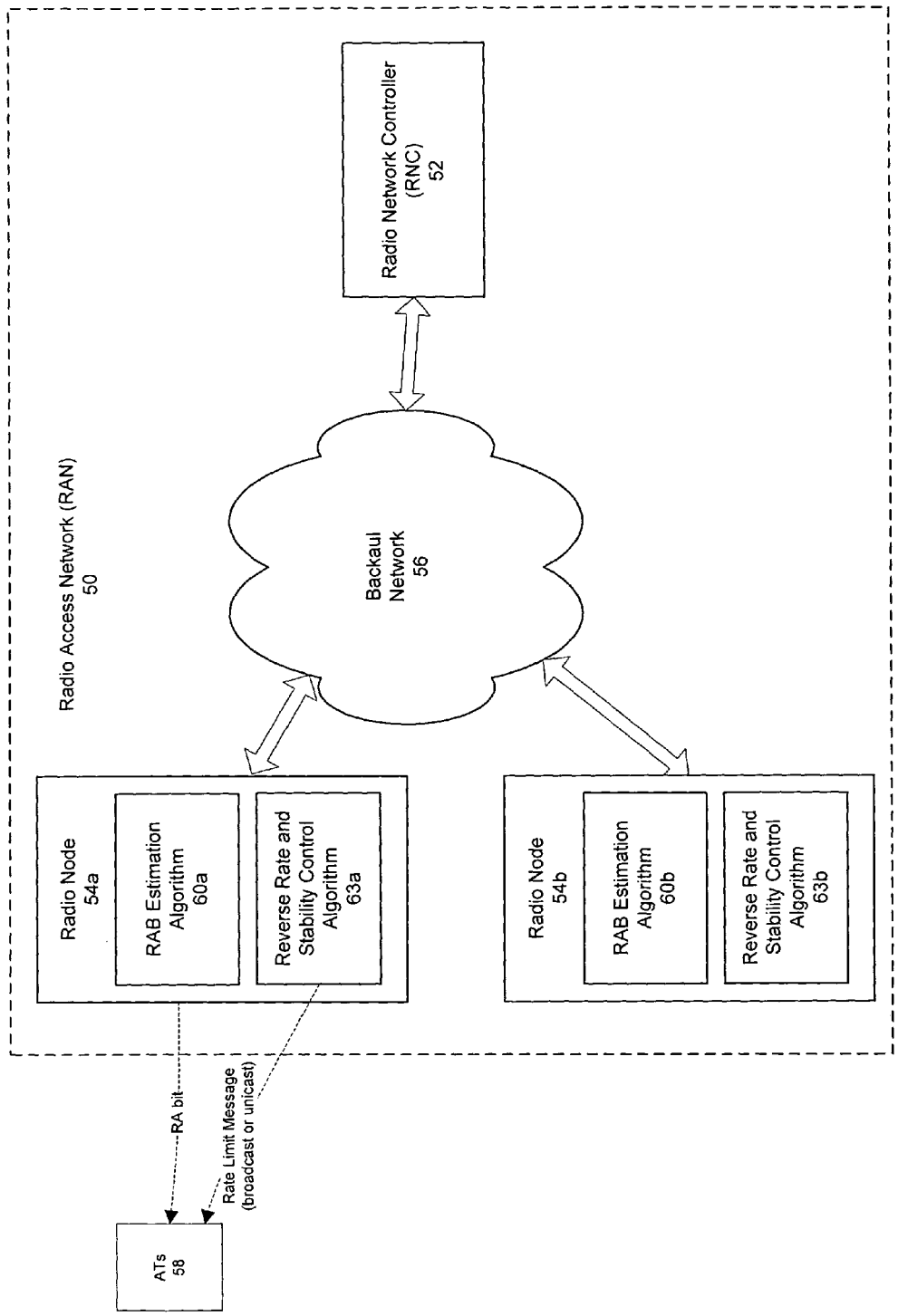

In the implementations illustrated in FIGS. 4 and 5A-5B a reverse rate and stability control algorithm may be executed for a particular AT in all of the sectors in which the AT has a connection. This can be considered an optimal approach. In some implementations, however, determination of the effective number of connections is performed only on a subset of the sectors with which an AT has a connection. For example, an RN may determine an effective number of connections for the sectors with which an AT has a connection AND are serviced by the RN. Thus, the RAN would not determine an effective number of connections for sectors in which the AT is in soft handoff. An approach that considers a subset of the sectors with which an AT has a connection can be considered a sub-optimal approach, but nonetheless can prevent sector overload without having to implement inter-RN messaging or additional RNC-RN messaging across the backhaul network. For example, as shown in FIG. 6, each RN 54a, 54b executes a reverse rate and stability control algorithm without receiving information about a number of connections in other sectors that an AT, e.g., AT 58, may be in soft handoff with. As before, rate limit messages may be transmitted either via unicast or broadcast messaging.

Figure 7:
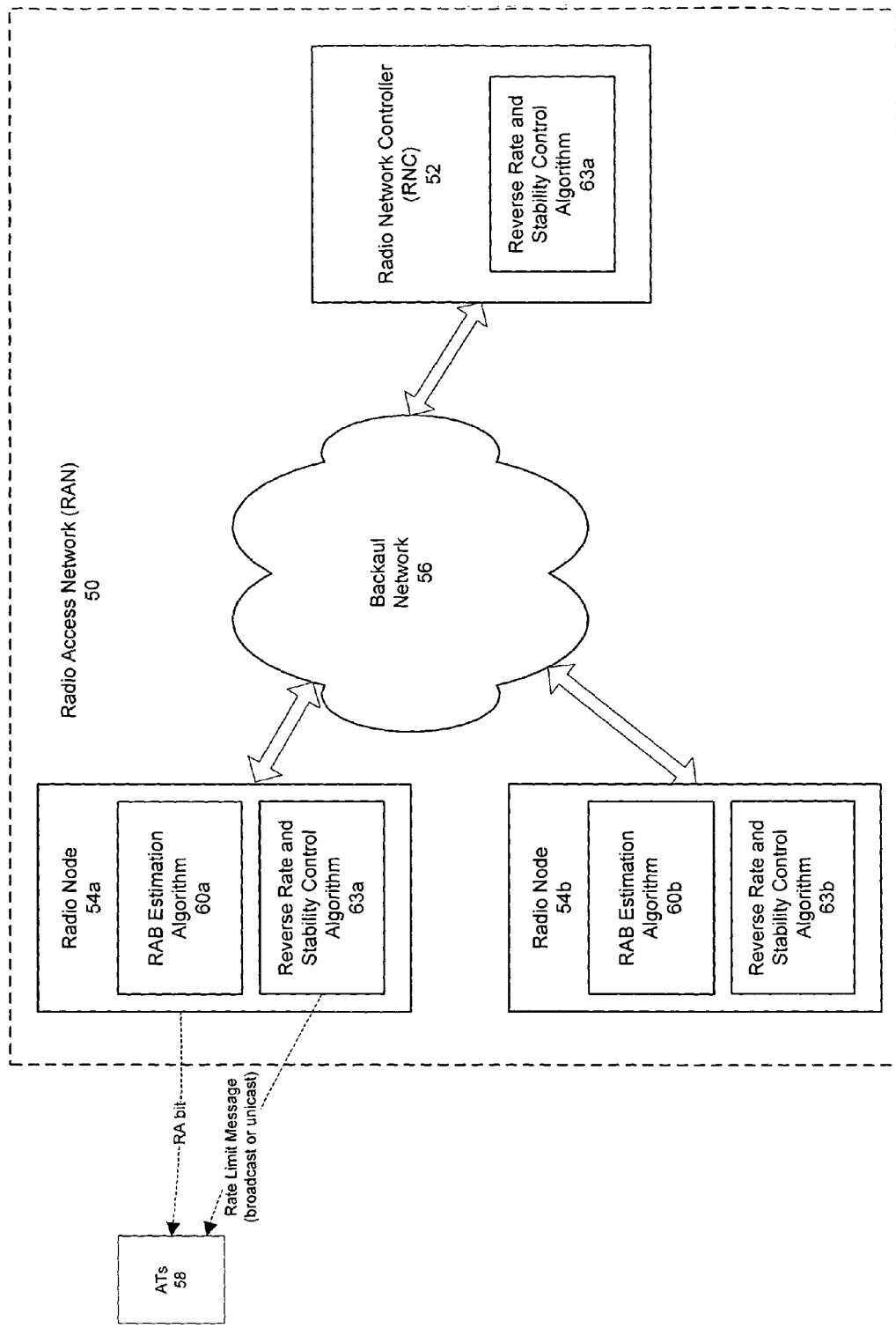

In some implementations, a hybrid approach between the optimal and sub-optimal approaches is taken. For example, as shown in FIG. 7, each of the RNs 54a, 54b executes a reverse rate and stability control algorithm over ALL sectors for connections that are not in soft handoff, i.e., only the sectors within the radio node (54a or 54b) are analyzed. In addition, the RNC 52 executes a reverse rate and stability control algorithm over ALL sectors for connections that are in soft handoff with all the sectors being analyzed. If the connection is not in handoff or in softer handoff, the unicast or broadcast rate limit messages are transmitted from the radio node (54a or 54b) itself. If the connection is in soft handoff, then the unicast or broadcast rate limit messages are transmitted from the RNC 52.

As described above, rate limit messages can be transmitted to affected ATs either view unicast or broadcast messaging. In some implementations, ATs that are not in soft or softer handoff receive rate limit messages via broadcast messaging from the radio node in which they have a connection, whereas ATs that are in soft or soft-softer handoff receive unicast or broadcast rate limit messages from the RNC. For ATs in soft handoff, the RN transmits a broadcast rate limit message corresponding to no handoff that will be overridden by the unicast message transmitted from the RNC. For connections in soft-softer handoff, the RN transmits a broadcast rate limit message corresponding to softer handoff that will be overridden by the unicast message transmitted from the RNC.

A simulation performed on an implementation using the sub-optimal approach with a reverse rate and stability control algorithm using a generalized rate-weighting algorithm programmed according to Table I above and a maximum rate limit table programmed according to Table II above. The simulation showed an improved reverse link sector throughput while still ensuring stability of the reverse link versus an implementation in which all ATs were limited to a transmit rate of 38.4 Kbps. Embodiments on existing systems select a conservative rate limit (such as 38.4 Kbps) to maintain reverse link stability. The simulations were based on the Strawman models provided the 3GPP2 standard bodies (3GPP2-1xEV-DO Evaluation Methodology (V1.3)) for wireless network simulation. Simulation results for a heavily loaded sector having 18 connections are shown in Table III.

TABLE III

| Activity Factor (fraction of connections with data to send) | Implementation in which the reverse rate and stability control algorithm use GRW algorithm shown in Table I and MRLT shown in Table II | | Implementation in which reverse rate is limited to 38.4 Kbps for all ATs | |
|---|---|---|---|---|
| | Average Sector Throughput [kbps] | Average ROT[dB] | Average Sector Throughput[kbps] | Average ROT[dB] |
| 0.25 | 298.00 | 5.78 | 117.36 | 2.2 |
| 0.5 | 290.05 | 5.70 | 116.04 | 2.2 |
| 1.0 | 269.93 | 5.84 | 114.06 | 2.3 |

Note that the simulation of a RAN using a reverse rate and stability control algorithm achieved better sector throughput while operating at acceptable ROT than that of a RAN using which limited the transmit rate to 38.4 Kbps for all ATs in a sector.

In a system where more than one method for ROT measurement and/or post-AGC-ROT estimation is available, the system may use different rate weightings in the generalized rate-weighting algorithm may differ depending on the ROT/post-AGC-ROT estimation method used. Similarly, the system may use different rate limit tables (e.g., Table II above) depending on the ROT/post-AGC-ROT estimation method used. For example, if the system uses highly accurate RA bit estimation method (e.g., ROT measurement), the system may employ one weight limit table, whereas if the system uses a less accurate RA bit estimation method (e.g., a post-AGC-estimation ROT method), it may switch to a more conservative rate limit table.

A number of embodiments of the invention have been described. Nevertheless, it will be understood that various modifications may be made without departing from the spirit and scope of the invention, and, accordingly, other embodiments are within the scope of the following claims.

What is claimed is:

1. A method for controlling a rate of transmission of an access terminal in a radio access network, the method comprising:
   for a sector of one or more sectors of the radio access network in which the access terminal has a connection, determining an effective number of connections for the sector, wherein the effective number of connections for the sector is less than a number of reverse link connections for the sector, and wherein determining the effective number of connections for the sector comprises:
      for at least each reverse link connection in the sector, applying a weight to one or more characteristics of the reverse link connection to determine a weighted connection; and
      summing the weighted connections to determine the effective number of connections;
   and
   setting a rate limit for the access terminal based on the effective number of connections, wherein setting the rate limit comprises comparing the effective number of connections with one or more ranges of values and setting the rate limit based on the comparison.

2. The method of claim 1 wherein an effective number of connections is determined for each sector of the one or more sectors in which the access terminal has a connection.

3. The method of claim 1 wherein an effective number of connections is determined for each sector of the one or more sectors in which the access terminal has a connection serviced by a common radio node.

4. The method of claim 1 further comprising:
   performing a rise over thermal measurement for the sector; and
   transmitting a signal to the access terminal indicating that the sector is becoming overloaded if the rise over thermal measurement (ROT) exceeds a predetermined amount.

5. The method of claim 4 further comprising:
   performing a post automatic gain control ROT estimation for the sector; and
   transmitting a signal to the access terminal indicating that the sector is becoming overloaded if the post automatic gain control ROT estimation exceeds a predetermined amount.

6. The method of claim 1 wherein the radio access network comprises a first evolution data-only compliant network.

7. The method of claim 1 further comprising:
   transmitting the rate limit to the access terminal.

8. The method of claim 7 wherein transmitting the rate limit comprises:
   broadcasting a rate limit message to the access terminal in at least one of the one or more of the sectors in which the access terminal has a connection.

9. The method of claim 7 wherein transmitting the rate limit comprises:
   unicasting a rate limit message to the access terminal in a sector of the one or more sectors in which the access terminal has a traffic channel established.

10. The method of claim 1 further comprising:
    transmitting, to the access terminal, a rate limit message immediately upon the access terminal establishing a connection in a sector of the one or more sectors.

11. A radio node configured to transmit radio signals to, and receive radio signals from, an access terminal having one or more connections in a group of one or more sectors of a radio access network, the radio node comprising:
a processor; and
a medium bearing instructions to cause the processor to:
determine an effective number of connections for a sector of one or more sectors of the radio access network in which the access terminal has a connection, wherein the effective number of connections for the sector is less than a number of reverse link connections for the sector, and wherein determining the effective number of connections for the sector comprises:
for at least each reverse link connection in the sector, applying a weight to one or more characteristics of the reverse link connection to determine a weighted connection; and
summing the weighted connections to determine the effective number of connections;
and
set a rate limit for the access terminal based on the effective number of connections, wherein the instructions cause the processor to set the rate limit by comparing the effective number of connections with one or more ranges of values and setting the rate limit based on the comparison.

12. The radio node of claim 11 wherein the instructions cause the processor to determine an effective number of connections for each sector of the one or more sectors in which the access terminal has a connection.

13. The radio node of claim 11 wherein the group of one or more sectors is serviced by the radio node, and the radio node is further configured to receive an effective number of connections for other sectors of the one or more sectors in the radio access network in which the access terminal has a connection but is not in the group of one or more sectors serviced by the radio node.

14. The radio node of claim 13 wherein the effective number of connections for the other sectors is received from another radio node.

15. The radio node of claim 13 wherein the effective number of connections for the other sectors is received from a radio network controller.

16. The radio node of claim 11 wherein the medium also includes instructions that cause the processor to:
transmit the rate limit to the access terminal.

17. The radio node of claim 16 wherein the instructions cause the processor to transmit the rate limit to the access terminal via a unicast message.

18. The radio node of claim 16 wherein the instructions cause the processor to transmit the rate limit to the access terminal via a broadcast message.

19. A system for controlling a rate of transmission of an access terminal in a radio access network, the system comprising:
a processor; and
a medium bearing instructions to cause the processor to:
determine an effective number of connections for a sector of one or more sectors of the radio access network in which the access terminal has a connection, wherein the effective number of connections for the sector is less than a number of reverse link connections for the sector, wherein determining the effective number of connections for the sector comprises:
for at least each reverse link connection in the sector, applying a weight to one or more characteristics of the reverse link connection to determine a weighted connection; and
summing the weighted connections to determine the effective number of connections;
and
set a rate limit for the access terminal based on the effective number of connections by comparing the effective number of connections with one or more ranges of values and setting the rate limit based on the comparison.

20. The system of claim 19 wherein the processor is part of a radio node configured to transmit radio signals to and receive radio signals from access terminals having connections in a group of one or more sectors of the radio access network, the group of one or more sectors being serviced by the radio node.

21. The system of claim 19 wherein the processor is part of a radio network controller configured to control a plurality of radio nodes collectively servicing a group of sectors in the radio access network.

22. The system of claim 20 wherein the instructions cause the processor to determine an effective number of connections for each sector of the one or more sectors in which the access terminal has a connection.

23. The system of claim 21 wherein the instructions cause the processor to determine an effective number of connections for each sector of the one or more sectors in which the access terminal has a connection.

24. The system of claim 22 further comprising:
a radio network controller in communication with said radio node, wherein the radio network controller comprises:
a second processor; and
a second medium bearing instructions that cause the second processor to determine a second effective number of connections for the access terminal in sectors of the one or more sectors in which the access has a connection but which are not part of the group of one or more sectors serviced by the radio node.

25. The system of claim 24 wherein the second medium also includes instructions that cause the second processor to set a second rate limit based on the second effective number of connections.

26. The system of claim 19 wherein the one or more characteristics of the reverse link connection comprise at least one of the following:
whether the reverse link connection has data to send,
a location of an associated access terminal, the associated access terminal being associated with the reverse link connection in the sector, the location being determined using an earliest pseudo-random noise offset measurement,
a requested downlink rate of the associated access terminal for the reverse link connection,
a handoff factor assigned to the associated access terminal, or
a strength of a pilot signal reported in a route update message for the reverse link connection.

27. The method of claim 1 wherein the one or more characteristics of the reverse link connection comprise at least one of the following:
whether the reverse link connection has data to send,
a location of an associated access terminal, the associated access terminal being associated with the reverse link connection in the sector, the location being determined using an earliest pseudo-random noise offset measurement,
a requested downlink rate of the associated access terminal for the reverse link connection, a handoff factor assigned to the associated access terminal, or a strength of a pilot signal reported in a route update message for the reverse link connection.

28. The radio node of claim 11 wherein the one or more characteristics of the reverse link connection comprise at least one of the following:

whether the reverse link connection has data to send, a location of an associated access terminal, the associated access terminal being associated with the reverse link connection in the sector, the location being determined using an earliest pseudo-random noise offset measurement, a requested downlink rate of the associated access terminal for the reverse link connection, a handoff factor assigned to the associated access terminal, or a strength of a pilot signal reported in a route update message for the reverse link connection.

29. A radio network controller configured to transmit radio signals to, and receive radio signals from, an access terminal having one or more connections in a group of one or more sectors of a radio access network, the radio network controller comprising:

a processor; and a medium bearing instructions to cause the processor to:

determine an effective number of connections for a sector of one or more sectors of the radio access network in which the access terminal has a connection, wherein the effective number of connections for the sector is less than a number of reverse link connections for the sector, wherein determining the effective number of connections for the sector comprises:

for at least each reverse link connection in the sector, applying a weight to one or more characteristics of the reverse link connection to determine a weighted connection; and summing the weighted connections to determine the effective number of connections;

and set a rate limit for the access terminal based on the effective number of connections by comparing the effective number of connections with one or more ranges of values; and setting the rate limit based on the comparison.

30. The radio network controller of claim 29 wherein the radio network controller is configured to transmit radio signals to, and receive radio signals from, the access terminal via one or more radio nodes of the radio access network.

31. The radio network controller of claim 29 wherein the one or more characteristics of the reverse link connection comprise at least one of the following:

whether the reverse link connection has data to send, a location of an associated access terminal, the associated access terminal being associated with the reverse link connection in the sector, the location being determined using an earliest pseudo-random noise offset measurement, a requested downlink rate of the associated access terminal for the reverse link connection, a handoff factor assigned to the associated access terminal, or a strength of a pilot signal reported in a route update message for the reverse link connection.

32. A method for controlling a rate of transmission of an access terminal in a radio access network, the method comprising:

for a sector of one or more sectors of the radio access network in which the access terminal has a connection, determining an effective number of connections for the sector, wherein the effective number of connections for the sector is less than a number of reverse link connections for the sector; and setting a rate limit for the access terminal based on the effective number of connections, wherein setting the rate limit comprises:

assigning a first rate limit if the effective number of connections determined for the access terminal is within a first range of values; and assigning a second rate limit if the effective number of connections determined for the access terminal is within a second range of values.

33. A radio node configured to transmit radio signals to, and receive radio signals from, an access terminal having one or more connections in a group of one or more sectors of a radio access network, the radio node comprising:

a processor; and a medium bearing instructions to cause the processor to:

determine an effective number of connections for a sector of one or more sectors of the radio access network in which the access terminal has a connection, wherein the effective number of connections for the sector is less than a number of reverse link connections for the sector; and set a rate limit for the access terminal based on the effective number of connections by:

setting a first rate limit if the effective number of connections determined for the access terminal is within a first range of values; and setting a second rate limit if the effective number of connections determined for the access terminal is within a second range of values.

34. A system for controlling a rate of transmission of an access terminal in a radio access network, the system comprising:

a processor; and a medium bearing instructions to cause the processor to:

determine an effective number of connections for a sector of one or more sectors of the radio access network in which the access terminal has a connection, wherein the effective number of connections for the sector is less than a number of reverse link connections for the sector; and set a rate limit for the access terminal based on the effective number of connections by:

setting a first rate limit if the effective number of connections determined for the access terminal is within a first range of values; and setting a second rate limit if the effective number of connections determined for the access terminal is within a second range of values.

35. A radio network controller configured to transmit radio signals to, and receive radio signals from, an access terminal having one or more connections in a group of one or more sectors of a radio access network, the radio network controller comprising:

a processor; and a medium bearing instructions to cause the processor to:

determine an effective number of connections for a sector of one or more sectors of the radio access network in which the access terminal has a connection, wherein the effective number of connections for the sector is less than a number of reverse link connections for the sector; and set a rate limit for the access terminal based on the effective number of connections by:
setting a first rate limit if the effective number of connections determined for the access terminal is within a first range of values; and
setting a second rate limit if the effective number of connections determined for the access terminal is within a second range of values.

* * * * *